(12) United States Patent
Khoshnevis

(10) Patent No.: US 7,153,454 B2
(45) Date of Patent: Dec. 26, 2006

(54) MULTI-NOZZLE ASSEMBLY FOR EXTRUSION OF WALL

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 10/760,963

(22) Filed: Jan. 20, 2004

(65) Prior Publication Data

US 2004/0164436 A1     Aug. 26, 2004

Related U.S. Application Data

(60) Provisional application No. 60/441,572, filed on Jan. 21, 2003, provisional application No. 60/537,756, filed on Jan. 20, 2004.

(51) Int. Cl.
*B28C 47/00*    (2006.01)

(52) U.S. Cl. ............ 264/34; 264/173.12; 425/131.1; 425/375; 425/63

(58) Field of Classification Search ............ 52/745.09, 52/742.14, 742.13, 741.41, 425, 561, 309.15, 52/DIG. 7, 612, 426, 424; 249/20; 264/31, 264/34, 173.11, 173.12, 173.16, 173.17, 171.13; 425/112, 114, 131.1, 463, 375, 59, 63, 65

See application file for complete search history.

(56) References Cited

U.S. PATENT DOCUMENTS

| | | | | |
|---|---|---|---|---|
| 984,517 | A | * | 2/1911 | Rollinger ............... 52/372 |
| 1,578,511 | A | * | 3/1926 | Gladwin ............... 52/426 |
| 3,221,457 | A | * | 12/1965 | Vevoda ............... 52/328 |
| 3,562,991 | A | * | 2/1971 | Kustusch ............... 52/564 |
| 4,066,723 | A | | 1/1978 | King et al. ............... 264/34 |
| 4,517,780 | A | * | 5/1985 | Lacombe et al. ............... 52/233 |
| 4,606,169 | A | * | 8/1986 | Noon et al. ............... 52/747.12 |
| 4,833,855 | A | * | 5/1989 | Winter, IV ............... 52/591.4 |
| 5,059,266 | A | | 10/1991 | Yamane et al. ............... 156/64 |
| 5,529,471 | A | | 6/1996 | Khoshevis ............... 425/112 |
| 5,656,230 | A | | 8/1997 | Khoshevis ............... 264/401 |
| 5,664,382 | A | * | 9/1997 | Melnick et al. ............... 52/425 |
| 5,749,196 | A | * | 5/1998 | Bangma ............... 52/561 |
| 6,103,161 | A | | 8/2000 | Lopez ............... 264/148 |
| 6,170,220 | B1 | * | 1/2001 | Moore, Jr. ............... 52/741.13 |
| 6,363,683 | B1 | | 4/2002 | Moore, Jr. ............... 52/741.13 |
| 6,423,261 | B1 | | 7/2002 | Joseph et al. |
| 6,662,516 | B1 | * | 12/2003 | Vandehey et al. ......... 52/407.1 |

* cited by examiner

*Primary Examiner*—Joseph S. Del Sole
(74) *Attorney, Agent, or Firm*—McDermott Will & Emery LLP

(57) ABSTRACT

A multi-nozzle assembly may include a first nozzle configured to extrude material through a first outlet; a second nozzle configured to extrude material through a second outlet; and a third nozzle configured to extrude material through a third outlet, the third outlet being between the first and second outlets. Related construction processes and wall structures are also disclosed.

17 Claims, 13 Drawing Sheets

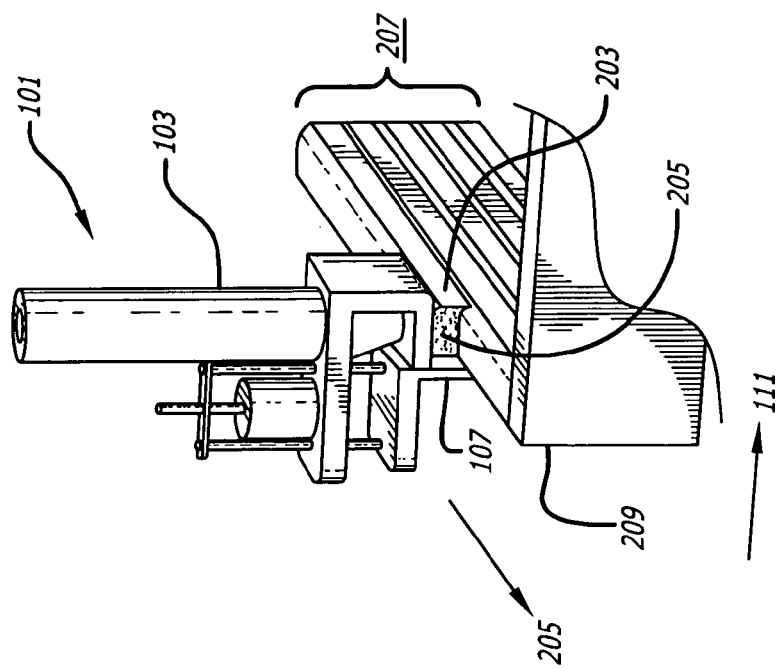
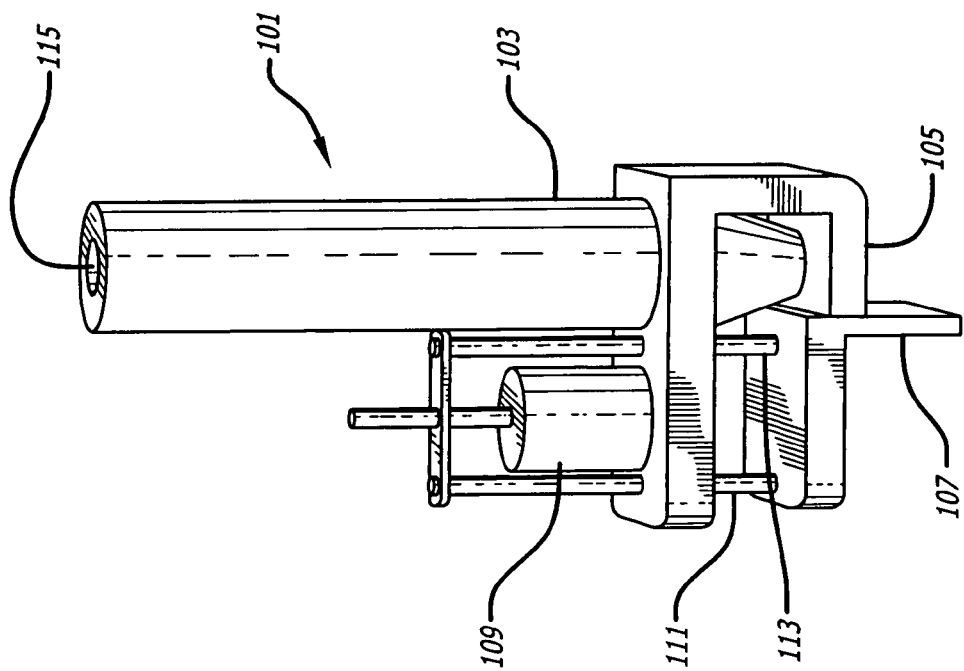
FIG. 2
FIG. 1

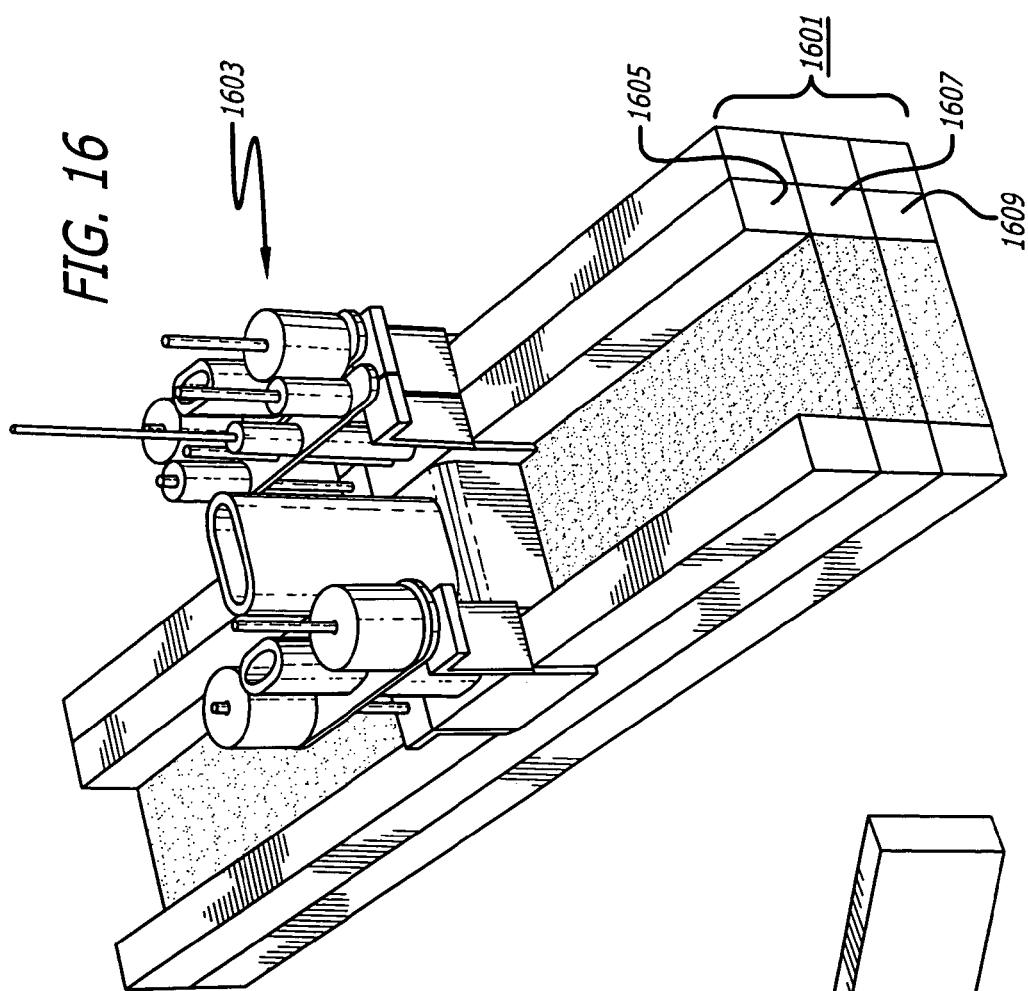
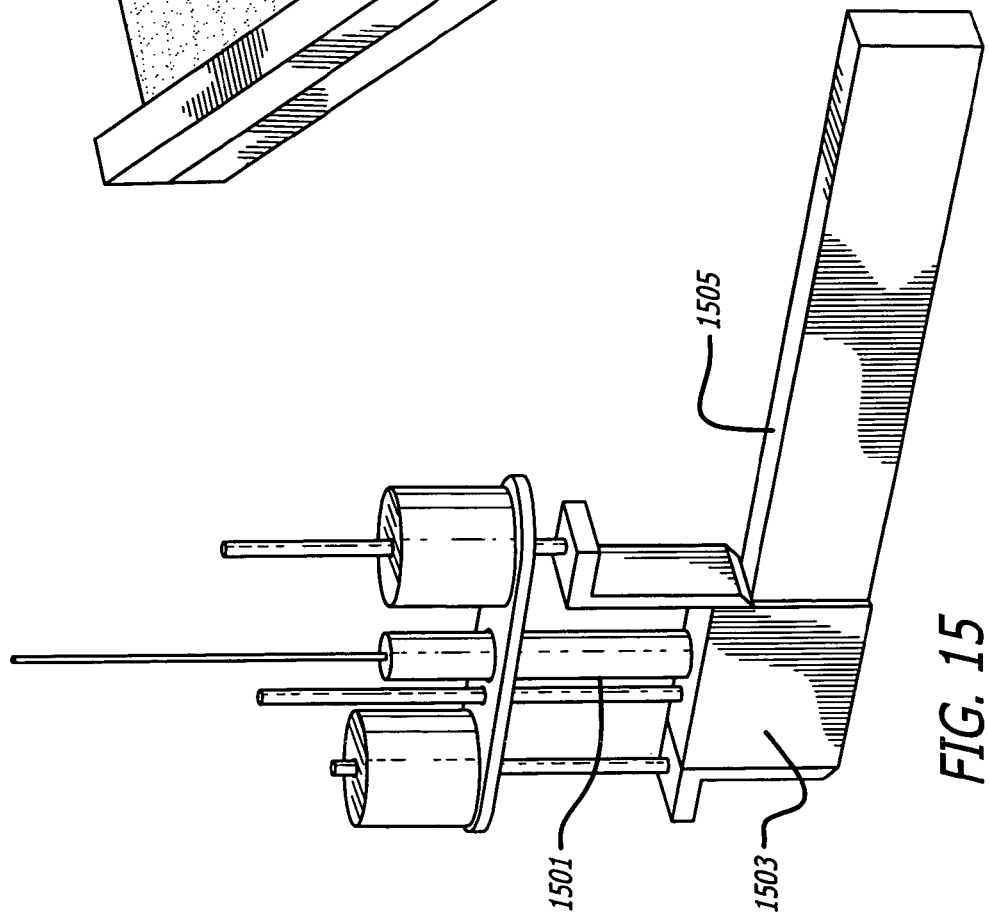

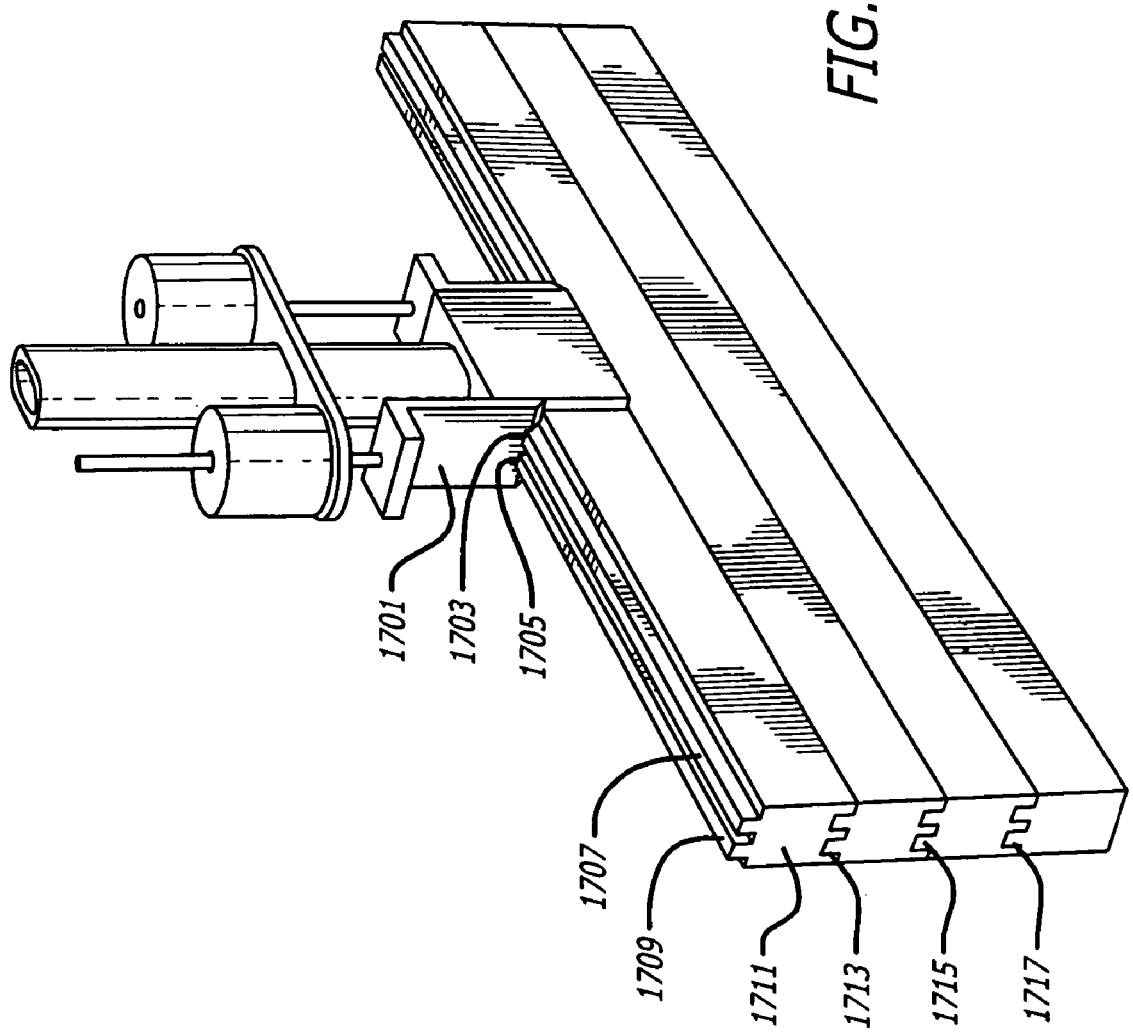

MULTI-NOZZLE ASSEMBLY FOR EXTRUSION OF WALL

CROSS-REFERENCE TO RELATED APPLICATIONS

This application is based upon and claims priority to U.S. Provisional Application Ser. No. 60/441,572, entitled "Automated Construction," filed on Jan. 21, 2003, by inventor Behrokh Khoshnevis, This application is also based upon U.S. Provisional Application Ser. No. 60/537,756, filed Jan. 20, 2004, entitled. "Automated Construction Techniques," filed concurrently with this application, also by inventor Behrokh Khoshnevis. The entire content of both of these provisional applications is incorporated herein by reference.

GOVERNMENT'S INTEREST IN APPLICATION

This invention was made with government support under NSF Grant No. 9634962 and NSF Grant No. 9522982 awarded by the United States Government. The government has certain rights in the invention.

BACKGROUND

1. Field

This application relates to the construction of structures, including the construction of walls and roofs. This application also relates to the extrusion of material.

2. Related Art

Constructing homes, offices, boats and other structures has an ancient heritage. Despite all of the centuries of development, however, there can be difficulties and problems.

Construction is usually very labor intensive. Even a modest size structure usually requires the efforts of numerous individuals. This can be very costly. Simultaneously using the time of numerous individuals in an efficient manner can also be challenging.

The results of the construction effort can also be inconsistent. The appearance and quality of one structure can vary from another built from the same design. This can be caused by differences in the skills, efforts, supervision and techniques employed by those that work on the structures.

Construction may also result in wasted material. For example, when wood is used, standard, off-the-shelf lengths must often be cut to meet design requirements, resulting in waste.

Construction using manual labor can also be very time-consuming, requiring months and, in some instances, years to complete.

Construction can also be hazardous. Many construction workers are killed or seriously injured at construction sites, including about 500,000 in the United States alone.

SUMMARY

A multi-nozzle assembly may include a first nozzle configured to extrude material through a first outlet; a second nozzle configured to extrude material through a second outlet; and a third nozzle configured to extrude material through a third outlet, the third outlet being between the first and-second outlets.

Each outlet may have a substantially rectangular cross-section.

The multi-nozzle assembly may include a nozzle position controller that is configured to controllably vary the height of at least one of the outlets with respect to the height of at least one of the other outlets.

The multi-nozzle assembly may include a first and/or second trowel configured to shape material extruded from the first and/or second nozzles, respectively.

The width of the first and the second outlet may be less than the width of the third outlet.

The multi-nozzle assembly may include an orientation-control mechanism configured to control the orientation of the multi-nozzle assembly. The orientation-control mechanism may be configured to control the orientation of the multi-nozzle assembly in three dimensions. The nozzle may be mounted on a XYZ motion control platform, such as a gantry robot. This may give the outlet 6 degrees of freedom.

The multi-nozzle assembly may include a material feed system configured to feed material to each nozzle. The material feed system may be configured to keep the material that is fed to the first and second nozzles separate from the material that is fed to the third nozzle. The material feed system may include a valve system configured to selectably cut off the flow of material to each of the nozzles in a controllable manner.

The multi-nozzle assembly may include a controllable gate configured to controllably block material extruded from at least one of the nozzles from flowing in a direction.

A construction method may include simultaneously extruding a first layer of two, spaced apart rims. After extruding the first layer of rims, a further layer of two, spaced apart rims may simultaneously be extruded, each directly or indirectly on top of one of the spaced apart rims in the first layer, along with a first layer of filler between the first layer of two, spaced apart rims.

The height of the first layer of rims and the first layer of filler may all be substantially the same.

The material used for the rims may be different than the material used for the filler. The material used for the rims may be plastic and the material used for the filler may be concrete.

The first layer of rims may be permitted to cure before extruding the further layer of rims and the first layer of filler.

The construction method may include, after extruding the further layer of rims, extruding a further layer of filler on top of the last extruded layer of filler without also simultaneously extruding a further layer of rims.

A wall may include a set of spaced apart rims, each comprised of a stacked set of separately-extruded layers; and a filler between the rims comprised of a stacked set of separately-extruded layers.

The rims may be made of a material that is different than the filler. The rims may be made of plastic and the filler may be made of concrete.

The wall may include one or more rectangular openings.

One of the layers of each rim may be extruded at the same time as one of the layers of the filler. The layers of each rim that may be extruded at the same time may be at a level within the wall that is different than the level of the layer of the filler that may have been extruded at the same time.

These as well as still further objects, features and benefits will now become clear from an examination of the detailed description of illustrative embodiments and the accompanying drawings.

BRIEF DESCRIPTION OF DRAWINGS

FIG. 1 illustrates one embodiment of a nozzle assembly that includes a single nozzle.

FIG. 2 illustrates the embodiment of the nozzle assembly shown in FIG. 1 being used to extrude a wall.

FIG. 15 illustrates the nozzle shown in FIG. 13 being used to extrude an insulation layer.

FIG. 16 illustrates a nozzle assembly using the nozzle shown in FIG. 13 being used to extrude a wall with a layer of insulation.

FIG. 17 illustrates another embodiment of a nozzle assembly having slots in a gate being used to extrude a wall with interlocked layers.

DESCRIPTION OF ILLUSTRATIVE EMBODIMENTS

Figure 3:
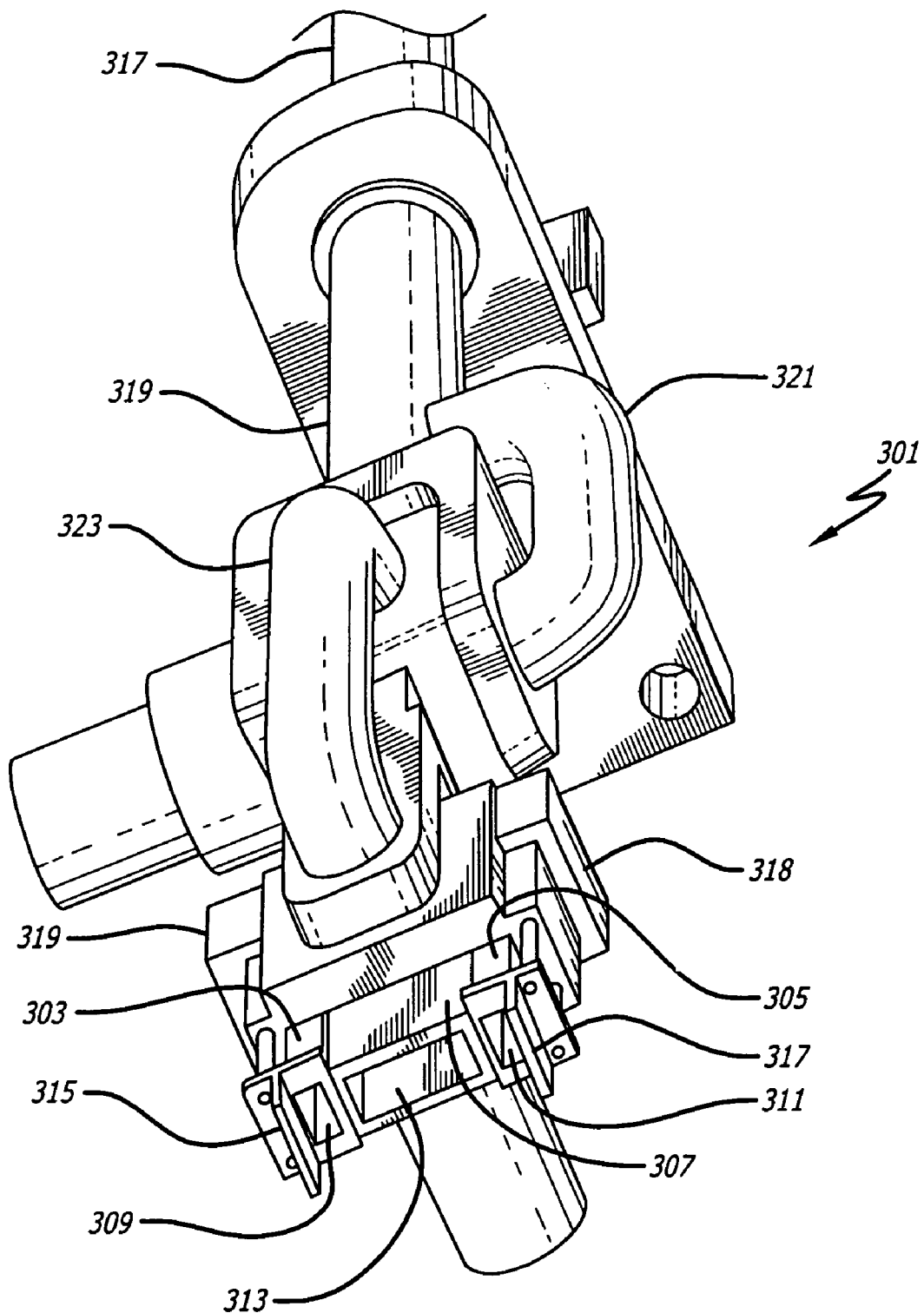
FIG. 3 illustrates another embodiment of a nozzle assembly that includes three nozzles.

FIG. 1 illustrates an embodiment of a nozzle assembly that includes a single nozzle. As shown in FIG. 1, a nozzle assembly 101 may include a nozzle 103 having an outlet 105 (not visible in FIG. 1), a trowel 107, and a trowel positioning controller, including a servo motor 109 and trowel linkage 111 and 113.

Although shown as cylindrical, the shape of the nozzle 103 may vary. It may include an inlet 115 for material in a fluid or semi-fluid form.

The cross-section of the outlet 105 may vary. It may be circular, rectangular or of some other shape.

FIG. 2 illustrates the embodiment of the nozzle assembly shown in FIG. 1 being used to extrude a wall. As shown in FIG. 2, the nozzle assembly 101 is extruding a layer of material 203 while being moved in a horizontal direction 205. The trowel 107 smoothens the exterior surface of the layer of material 203 as it is being extruded from the nozzle 103. The lower surface 205 of the member that supports the nozzle 103 has an opening (not shown) through which the extruded material flows. The lower surface 205 may also act as a trowel to smoothen the upper surface of the layer of material 203 that is being extruded. An additional trowel (not shown) may also be included to smoothen the interior surface of the layer 203 that is being extruded. Alternatively, a sharp blade parallel to the first trowel may cut out excess material on the interior side to create a planar surface.

Referring again to FIG. 1, the height of the trowel 107 may be controlled by the trowel position controller which, as explained above, includes the servo motor 109 and the trowel linkages 111 and 113. The height of the trowel 107 may be adjusted to correspond to the height of the extruded layer 203. By making the height of the trowel 107 adjustable, layers of different thickness may be extruded.

Although the smoothening surface of the trowel 107 and the underneath surface 205 are illustrated as being flat, other contours may be used instead.

Any type of material may be used and delivered into the inlet 115, including cement or plastic. The material may be delivered in a liquid or quasi-liquid form and may include or receive additives or may have characteristics that cause the material to harden into a solid after extrusion.

As is apparent from an examination of FIG. 2, the nozzle assembly 101 may be moved horizontally in a back-and-forth motion, each time being elevated in height by approximately the thickness of each extruded layer. The collective effect is to create a wall 207 consisting of a stacked set of separately-extruded layers.

The horizontal direction 205 of the nozzle assembly 101 at the end 209 of a pass may be altered by 90 degrees into the direction 111. This can produce an extruded wall that has a sharp right angle bend. Obviously, other types of changes in direction may be used to create other wall shapes, including curved walls and walls that join one another at angles other than 90 degrees.

FIG. 3 illustrates another embodiment of a nozzle assembly that includes three nozzles. As shown in FIG. 3, a nozzle assembly 301 includes an exterior nozzle 303, an interior nozzle 305 and a central nozzle 307. The exterior nozzle 303 may include an outlet 309, the interior nozzle 305 may include an outlet 311, and the central nozzle 307 may include an outlet 313. Although each outlet is illustrated as having a rectangular cross-section, other cross-sectional shapes could be used instead, such as round or oval. The width of the central outlet 313 may be equal to, greater or less than the width of the exterior outlet 309 or the interior outlet 311. The width of the exterior outlet 309 may be equal to or different than the width of the interior outlet 311.

A trowel 315 may be used to smooth the material that is extruded from the exterior outlet 309, while a trowel 317 may be used to smooth the material that is extruded from the interior outlet 311. The height of the exterior trowel 315 and the interior trowel 311 may, in turn, be controlled by trowel position controllers 319 and 318, respectively.

Figure 4A:
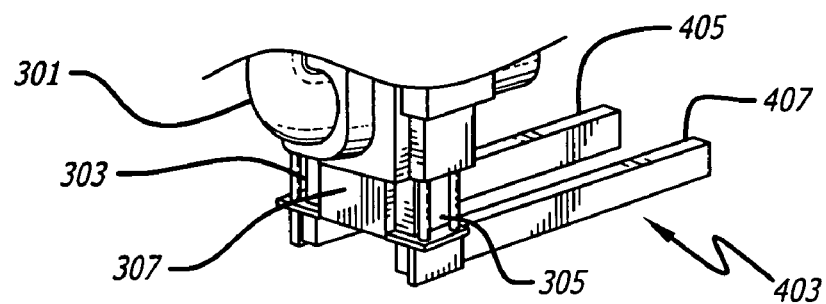
FIGS. 4(a)–(c) illustrate the embodiment of the nozzle assembly shown in FIG. 3 being used to extrude a wall.
Figure 4B:
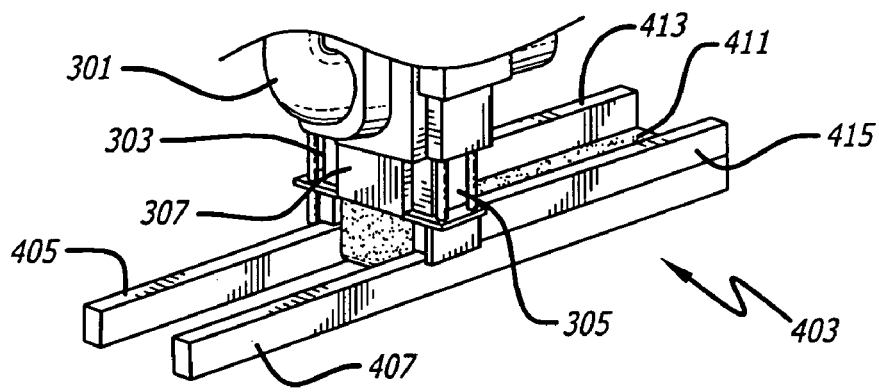
Figure 4C:
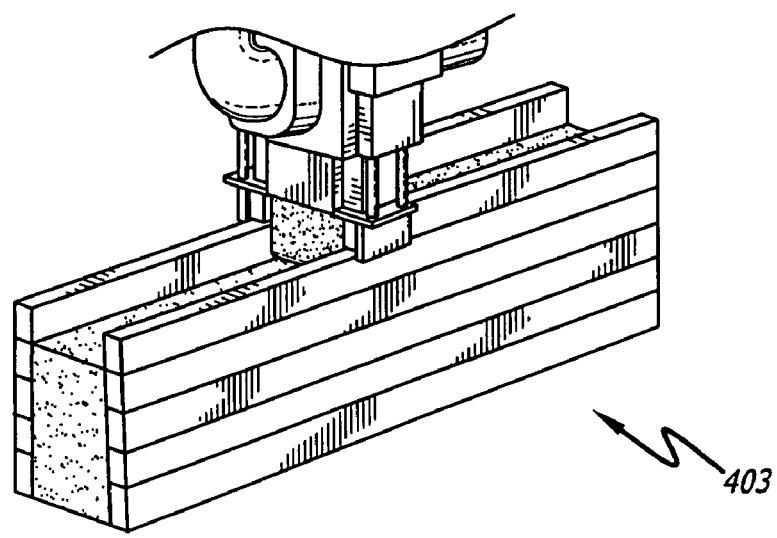

FIGS. 4(a)–(c) illustrate the embodiment of the nozzle assembly shown in FIG. 3 being used to extrude a wall.

As shown in FIG. 4(a), a first layer of a wall 403 may be extruded by moving the nozzle assembly 301 in a horizontal direction and by extruding material only through the exterior nozzle 303 and the interior nozzle 305. During this pass, no material may be extruded from the central nozzle 307.

This approach may cause an exterior rim layer 405 and an interior rim layer 407 of material to be extruded. Since no material is being extruded during this pass from the central nozzle 307, no significant force will be placed on the interior walls of the rim layers 405 and 407.

The rim layers may then be left to cure and thus harden. Various approaches such as thermal and chemical may be used to speed up the curing process. For example, a torch, hot air blower, or microwave energy may be attached to the nozzle assembly 301 (not shown) to treat the extruded material and speed its curing. A judicious choice of material may also be made for the rims, that cures quickly, such as plastic.

As shown in FIG. 4(b) another rim layer may be extruded on top of the rim layer that has hardened. This may consist of a second exterior rim 413 being extruded on top of the first exterior rim 405 and a second interior rim 415 being extruded on top of the first interior rim 407. A first filler layer 411 may also be extruded between the first rim layers 405 and 407 by extruding material from the central nozzle 307 at the same time that the second rim layers 413 and 415 are being extruded. The filler may be of a much stronger material, such as cement. The filler material may or may not dry as quickly as rim material.

If the rim layers are able to cure quickly enough, and if their length is long enough, the nozzle assembly 301 may be able to return to the beginning of a pass to extrude the next layer of rims on top of the previous layer as soon as extrusion of the previous layer is complete. If the curing is fast enough, the nozzle assembly may instead be directed to extrude its next layers of material during the return traverse. Other sequences could also be followed, including a rest between traverses.

The process may be repeated until the height of the wall 403 reaches the needed level. FIG. 4(c) illustrates the wall 403 with six layers. After the last needed rim layers are extruded, the next pass may extrude only a filler layer, thus completing the wall structure.

Delaying the extrusion of filler layers helps insure that the rim layers will be strong enough to contain their neighboring filler layers. Of course, the extrusion of each filler layer need not always or even ever be exactly one traverse behind the extrusion of each neighboring rim layer. In other embodiments, the filler layers might be two or more layers behind the neighboring rim layers. Indeed, none of the filler layers might be extruded until after all or at least several of the rim layers have been extruded and hardened. In this embodiment, the entire wall filler or at least a large portion of it could be extruded in a single pass.

Figure 5:
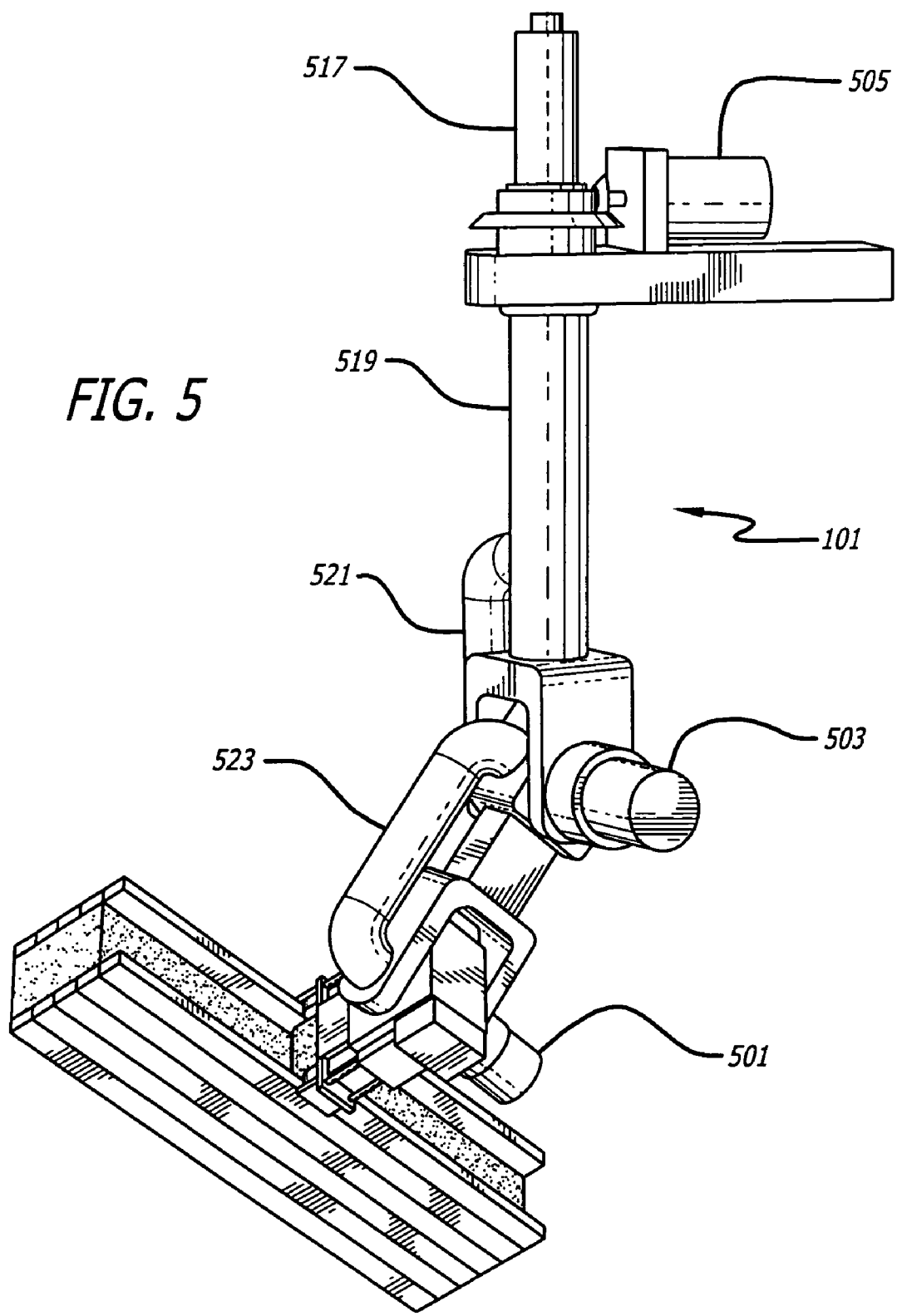
FIG. 5 illustrates the embodiment of the nozzle assembly shown in FIG. 3 being used to extrude a wall in an angled orientation.

FIG. 5 illustrates the embodiment of the nozzle assembly shown in FIG. 3 being used to extrude a wall at an angled orientation.

Material to be extruded may be delivered through outer tubes 517, 519, 521 and 523. Each of these outer tubes may contain within them a set of inner tubes, one channeling material to the exterior outlet 309 (see FIG. 3) and the interior outlet 311 (see FIG. 3), while the other channeling material to the central outlet 313 (see FIG. 3). In this way, the type of material that is delivered to the exterior outlet 309 and the interior outlet 311 may be different from the material that is delivered to the central outlet 313.

In another embodiment, each outer tube 517, 519, 521 and 523 may include three interior tubes, allowing a different type of material to be delivered to the exterior outlet 309 and the interior outlet 311 as well.

As also shown in FIG. 5 (and partially in FIG. 3), the nozzle assembly 101 may include an orientation control mechanism that can cause the outlets 309, 311 and 313 to be pointed in almost any direction. Any type of control mechanism may be used, including a control mechanism that is capable of orienting the outlets in one, two or three degrees of freedom. With respect to the nozzle assembly 101 shown in the figures, an orientation control mechanism has been selected that allows the outlets to be oriented in three dimensions. The orientation control mechanism may include servo motors 501, 503 and 505, each controlling a separate axis of orientation. Of course, appropriate internal structures may be included to translate the motion of these servo motors into the necessary movement. In certain embodiments, positioning information may be sent back to a servo controller (not shown) and used in one or more feedback loops to maximize the accuracy of the positioning that is obtained. Appropriate material channeling chambers and gaskets may also be included (not shown) to ensure that the material continues to flow without significant leakage in the moving joints, regardless of the angular orientation that is directed. The nozzle assembly may itself be moved around by a XYZ positioning system, thus providing 6 degrees of freedom to the nozzle head.

Although nozzle assemblies having only a single or three nozzles have thus-far been illustrated, it is to be understood that a different number of nozzles could be used, depending upon the application, such as two, four or even more.

Figure 6:
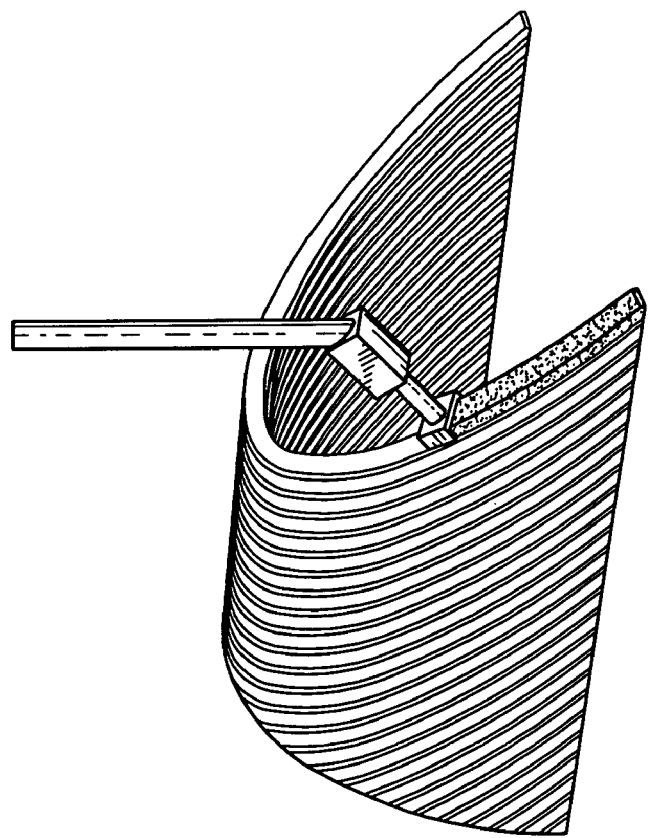
FIG. 6 illustrates a nozzle assembly having an orientation control mechanism being used to construct an embodiment of a supportless roof.
Figure 7:
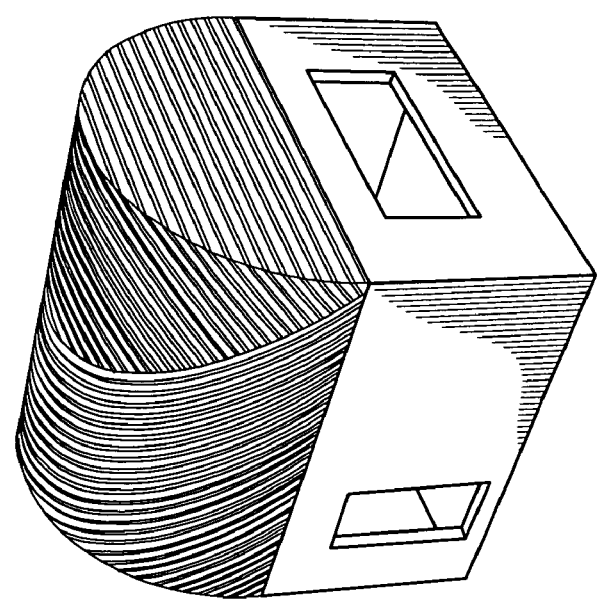
FIG. 7 illustrates the supportless roof shown in FIG. 6 in its completed state atop a wall structure.

FIG. 6 illustrates a nozzle assembly having an orientation control mechanism being used to construct an embodiment of a supportless roof. FIG. 7 illustrates the supportless roof shown in FIG. 6 in its completed state atop a wall structure. Collectively, these figures demonstrate how the positional flexibility of the nozzle assembly can facilitate the construction of supportless roofs, such as vaults. Although a nozzle assembly having only a single nozzle is illustrated, it is to be understood that a different number of nozzles could be used, such as the triple nozzle assembly shown in FIGS. 3–5.

Figure 8:
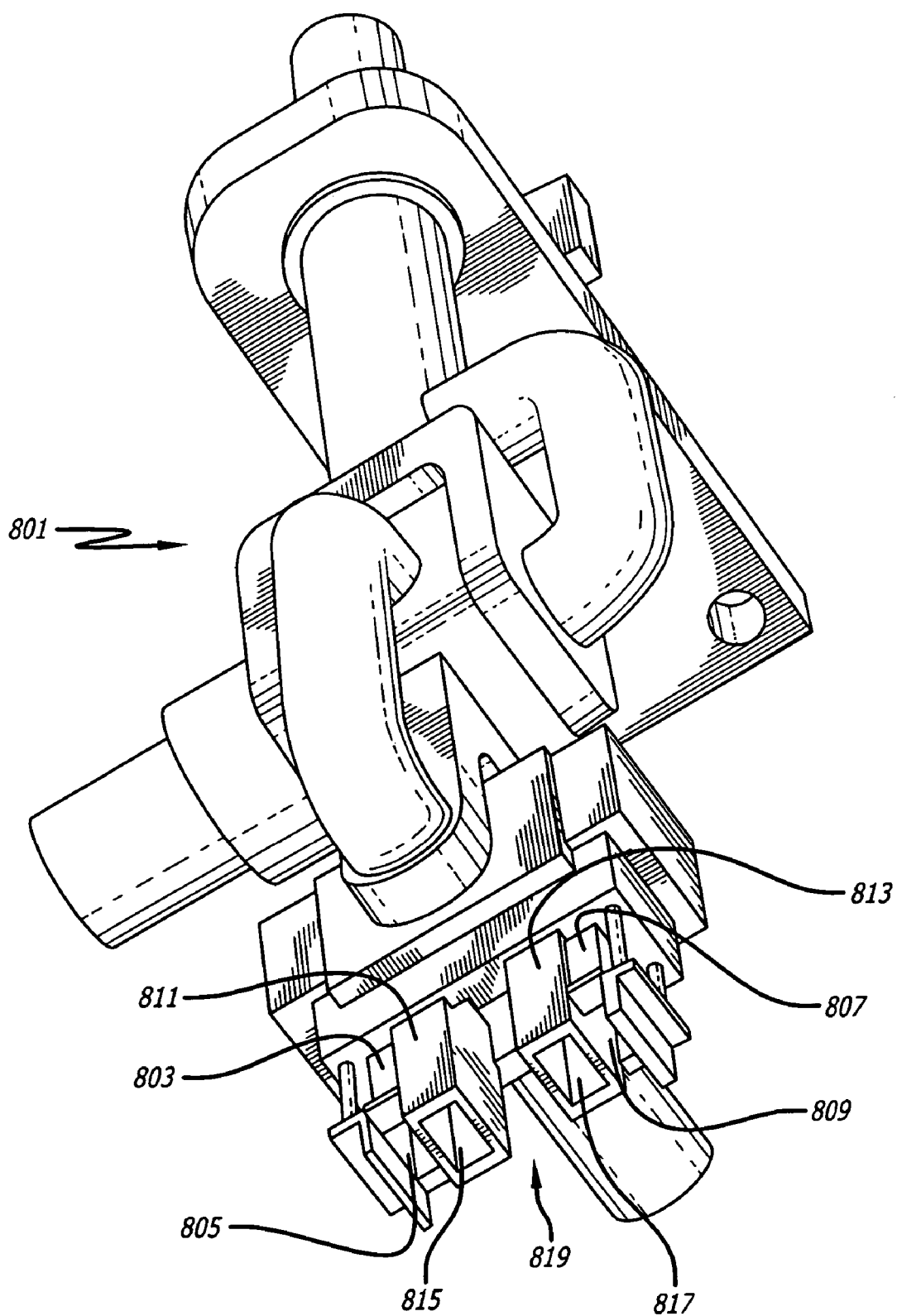
FIG. 8 illustrates another embodiment of a nozzle assembly that includes a slot in a central nozzle that accommodates reinforcement members.
Figure 9:
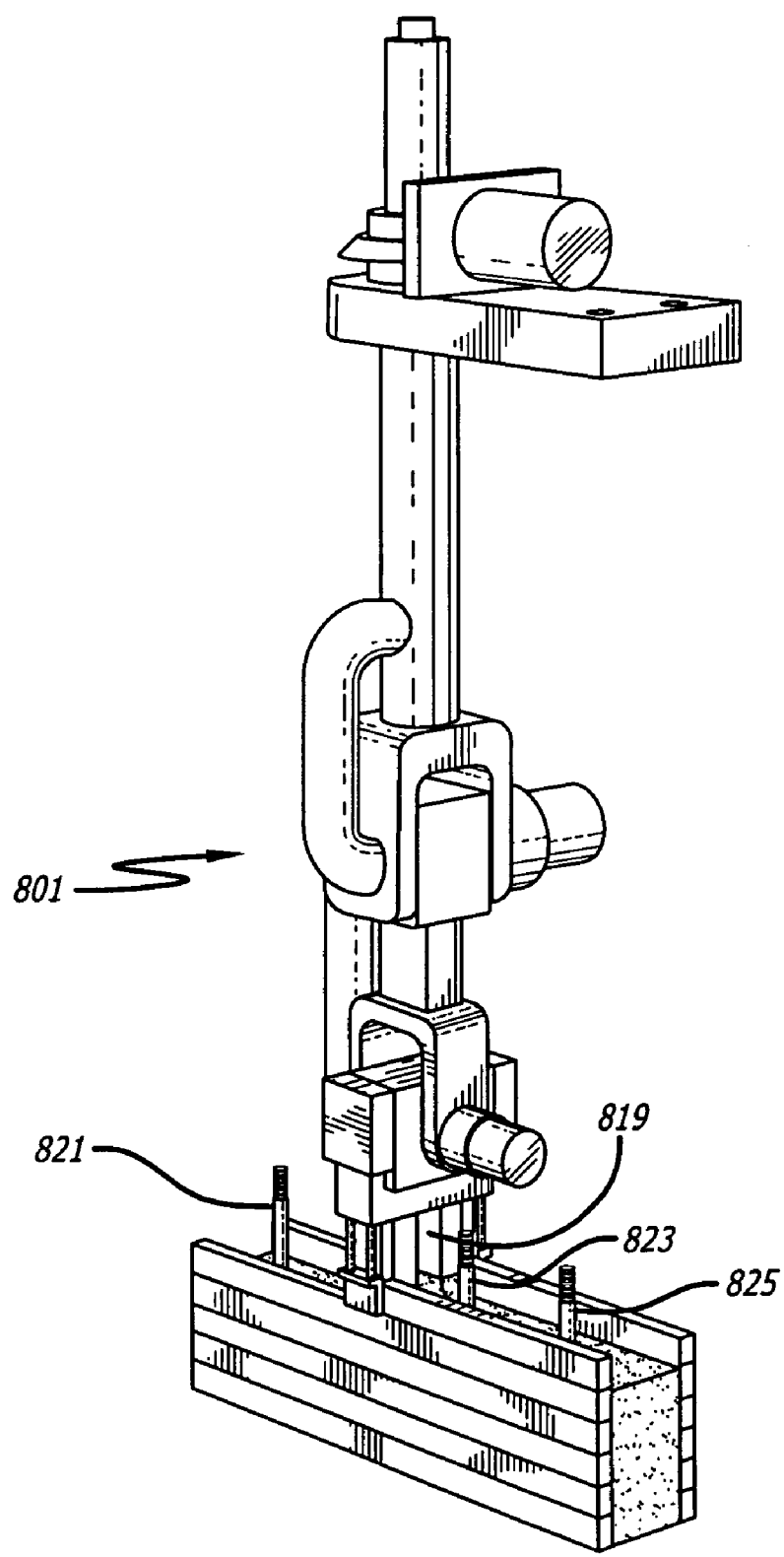
FIG. 9 illustrates the nozzle assembly shown in FIG. 8 being used to construct a wall having reinforcement members.

FIG. 8 illustrates another embodiment of a nozzle assembly that includes a slot in a central nozzle that accommodates reinforcement members. FIG. 9 illustrates the nozzle assembly shown in FIG. 8 being used to construct a wall having reinforcement members.

As shown in FIG. 8, a nozzle assembly 801 includes an exterior nozzle 803 having an outlet 805, an interior nozzle 807 having an outlet 809 and a central nozzle set consisting of two nozzles 811 and 813 having outlets 815 and 817, respectively, that are separated by an opening 819. FIG. 9 illustrates how the opening 819 ensures that the nozzle assembly 801 does not collide with reinforcing members 821, 823 or 825 during operation.

Figure 10:
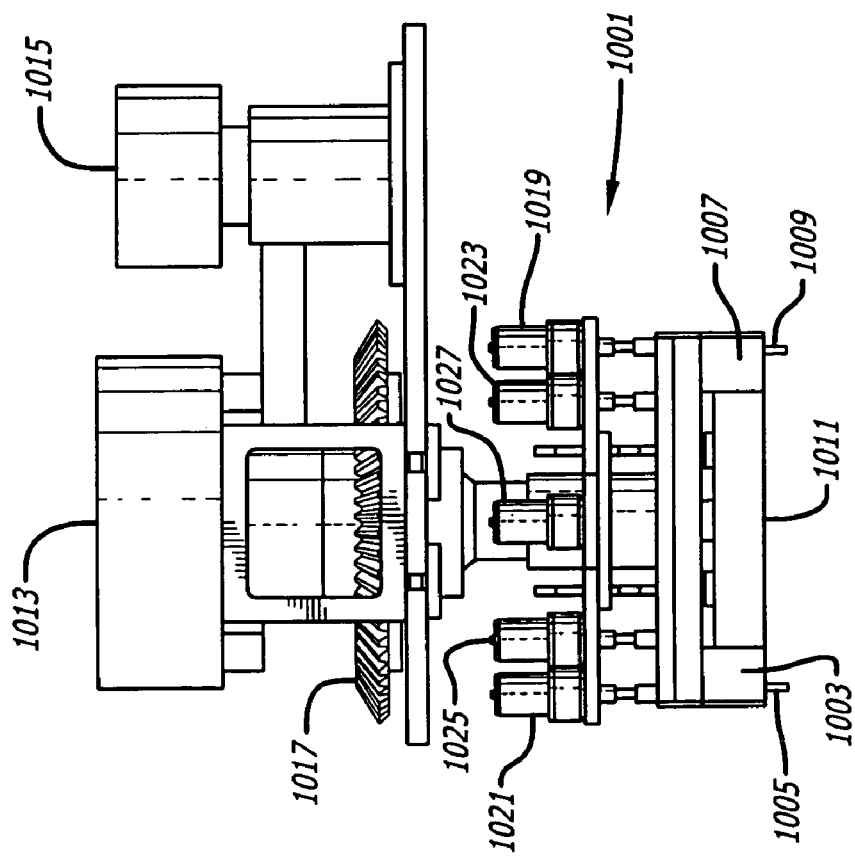
FIG. 10 illustrates another embodiment of a nozzle assembly.

FIG. 10 illustrates another embodiment of a nozzle assembly. As shown in FIG. 10, a nozzle assembly 1001 may include an exterior nozzle 1003 and an associated trowel 1005, an interior nozzle 1007 and an associated trowel 1009, and a central nozzle 1011. An inlet 1013 may be provided to receive material that is channeled to the central nozzle 1011 for extrusion, while an inlet 1015 may be provided to receive material that is channeled to the exterior nozzle 1003 and to the interior nozzle 1007 for extrusion. A bevel gear 1017 may be provided to rotate the nozzles.

Servo motors 1019 and 1021 may be used to control the height of the trowels 1009 and 1005, respectively. A servo motor 1025 may be used to control an internal gate valve (not shown) that is used to regulate the flow of material to the exterior nozzle 1003. Similarly, a servo motor 1023 may be used to control an internal gate valve (not shown) that is used to regulate the flow of material to the interior nozzle 1007. The flow of material to the central nozzle 1011 may also be regulated in a similar or different manner.

When making a curved wall, the rim material delivery rate may be different for the exterior and interior outlets. This may be effectuated by appropriate settings of the servo motors 1023 and 1025. The valve may be near or away from the nozzle. The gate valves may be configured to controllably adjust the volume of flow, as well as to completely cut the flow off.

A servo motor 1027 may be used to control the height of the central nozzle 1011 with respect to the external nozzle 1003 and the internal nozzle 1007. The heights of the external and/or internal nozzles may also be controlled in a similar or different manner.

Figure 11:
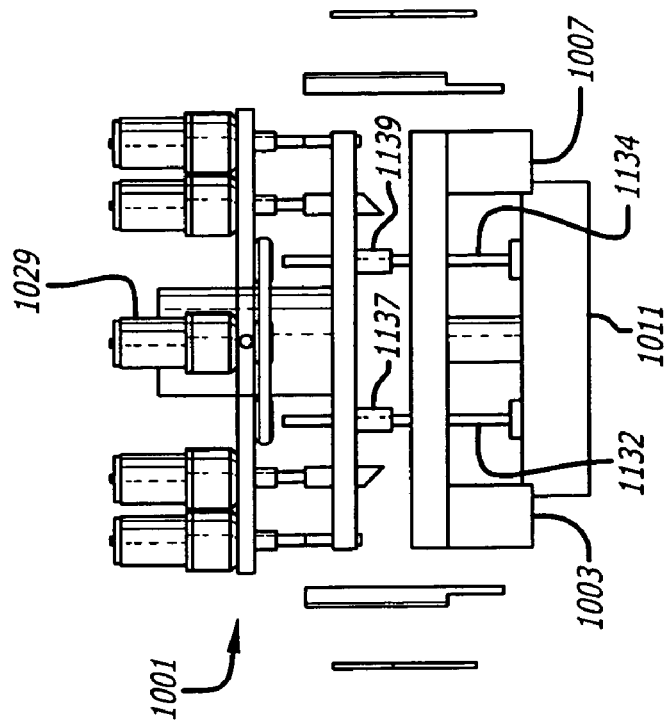
FIG. 11 illustrates certain components of the nozzle assembly shown in FIG. 10 in an unassembled form having a central nozzle at a height lower than interior and exterior nozzles.

FIG. 11 illustrates certain components of the nozzle assembly shown in FIG. 10 in an unassembled form with the central nozzle 1011 at a height lower than the interior nozzle 1007 and the exterior nozzle 1003. Such a height differential may be useful in embodiments in which each central filler layer is extruded one pass behind each surrounding rim layer. The ability to control the relative heights of the nozzles may also be useful in applications in which there is a need to avoid occasional obstructions.

Figure 12:
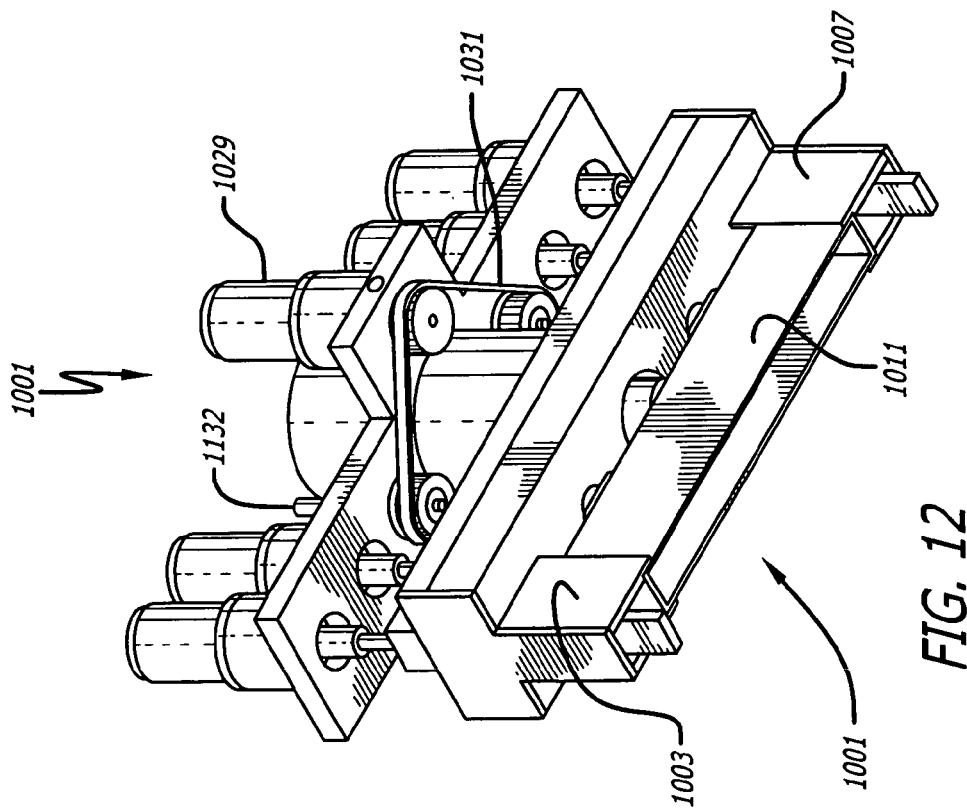
FIG. 12 illustrates a bottom view of a portion of the nozzle assembly shown in FIG. 10.

FIG. 12 illustrates a bottom view of a portion of the nozzle assembly 1001 shown in FIG. 10. It provides more detail on how the servo motor 1029 may control the height of the central nozzle 1011 with respect to the exterior nozzle 1003 and the interior nozzle 1007. This detail includes a drive belt 1031 that causes ball screws 1132 and 1134 (see FIG. 11) to rotate and to thus cause a corresponding change in the elevation of the central nozzle 1011 due to interaction with associated threaded sleeves 1137 and 1139 (FIG. 11), respectively.

Figure 13:
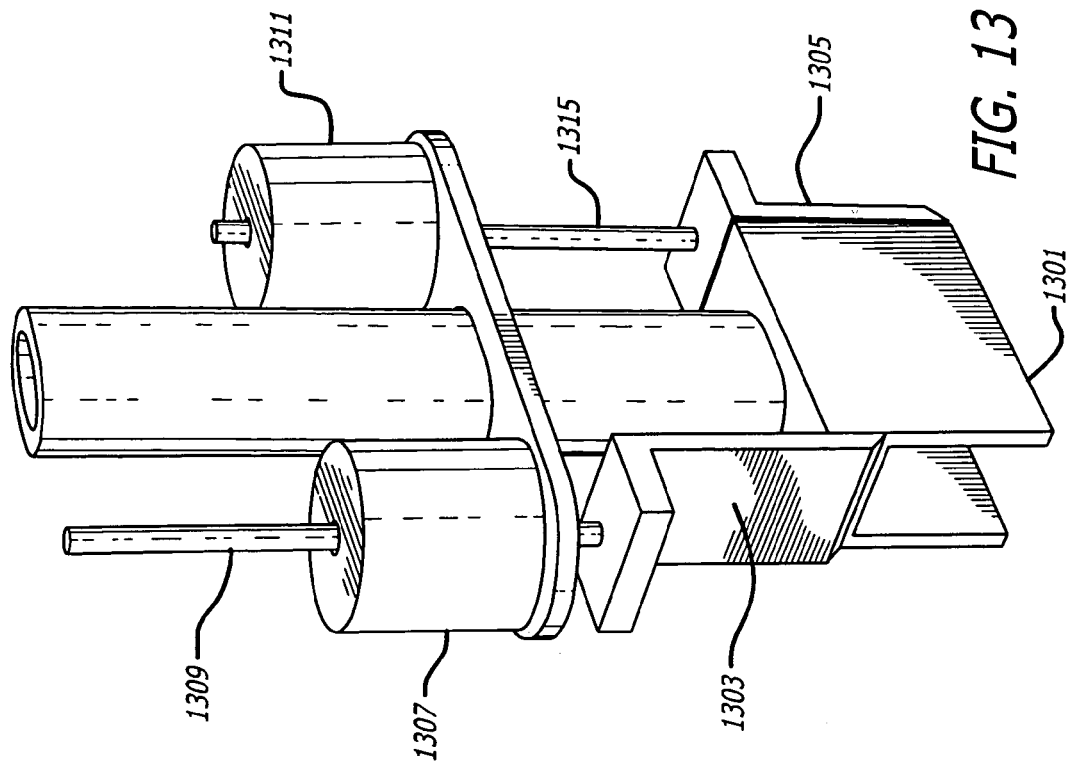
FIG. 13 illustrates an embodiment of a nozzle including a controllable front and rear gate.

FIG. 13 illustrates an embodiment of a nozzle including a controllable front and rear gate. As shown in FIG. 13, a nozzle 1301 includes a controllable front gate 1303 and a controllable rear gate 1305. The controllable gate 1303 may be controlled by a gate controller, such as a servo motor 1307 and an associated coupling 1309. Similarly, the controllable gate 1305 may be controlled by a gate control mechanism, such as a servo motor 1311 and an associated control mechanism 1315.

Figure 14:
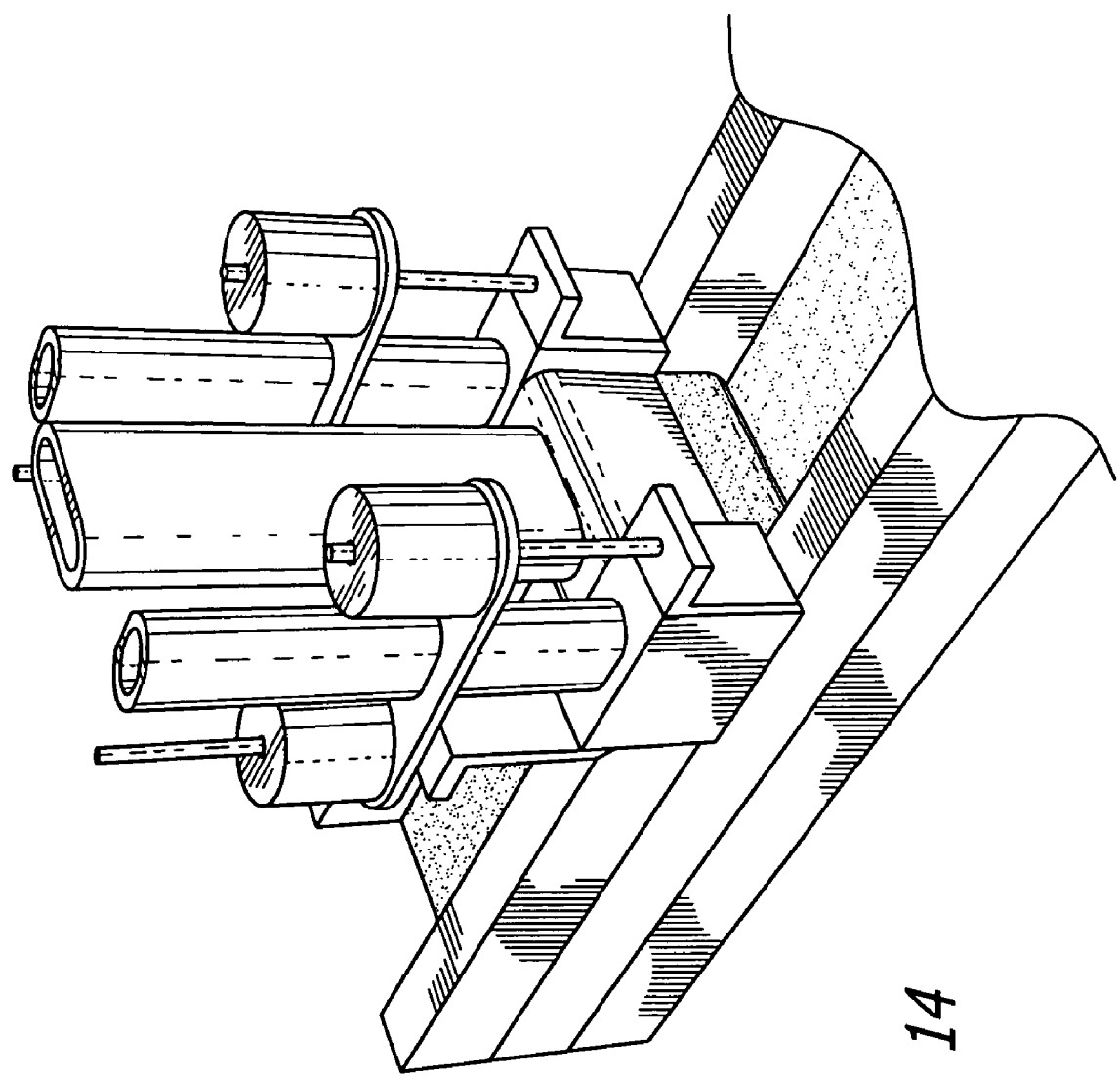
FIG. 14 illustrates one embodiment of a nozzle assembly using the type of nozzle shown in FIG. 13 being used to extrude a wall.

FIG. 14 illustrates one embodiment of a nozzle assembly with the nozzle shown in FIG. 13 being used to extrude a wall. This embodiment allows the beginning and end of each extruded layer to be shaped with a sharp vertical surface by appropriate control of the gates.

FIG. 15 illustrates the nozzle shown in FIG. 13 being used to extrude an insulation layer. In this embodiment, a polystyrene filament may be fed through an electrically heated barrel 1501 so that molten plastic comes out through a nozzle 1503. Compressed air may be mixed in as well to cause a bead of Styrofoam 1505 to be created. One or more of these layers may serve as insulation. Other types of polymers or other materials may be used instead.

FIG. 16 illustrates a nozzle assembly using the nozzle shown in FIG. 13 to extrude a wall with insulation. As shown in FIG. 16, a wall 1601 is being extruded by a nozzle assembly 1603 (shown only in part) that includes a stacked set of Styrofoam layers 1605, 1607 and 1609.

FIG. 17 illustrates another embodiment of a nozzle assembly having slots in a gate being used to extrude a wall with interlocked layers. As shown in FIG. 17, a gate 1701 includes slots 1703 and 1705 that cause corresponding ribs 1707 and 1709 to be created during the extrusion of the layer 1711. These create interlocking ribs, such as the interlocking ribs 1713, 1715 and 1717, thus strengthening the wall that is extruded.

Figure 18A:
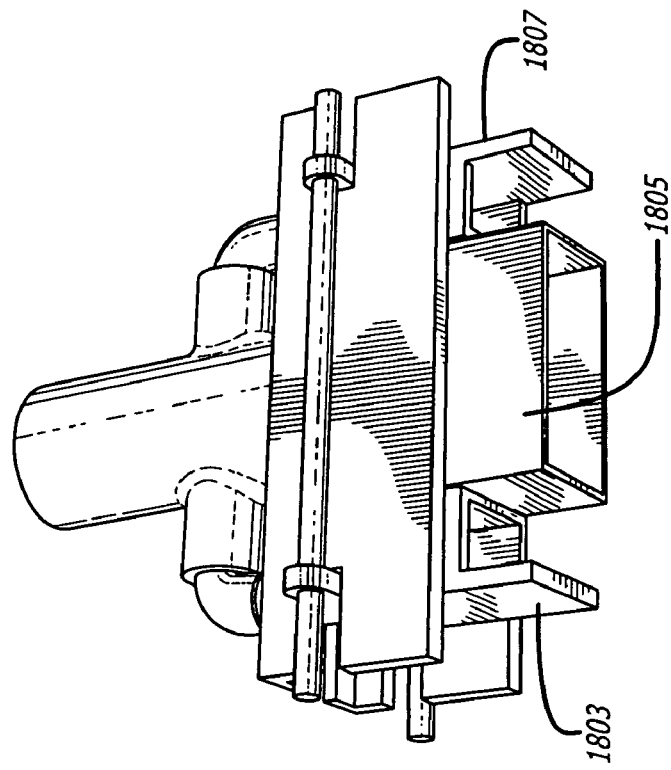
FIGS. 18(a) and (b) illustrate another embodiment of a nozzle assembly having variable width nozzles.
Figure 18B:
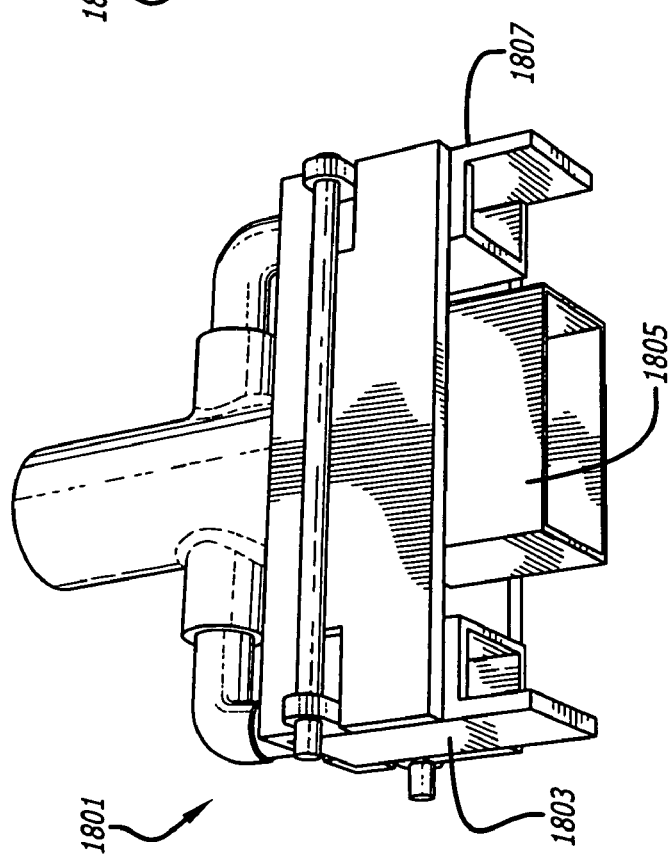

FIGS. 18(a) and (b) illustrate another embodiment of a nozzle assembly having variable width nozzles. As shown in FIGS. 18(a) and (b), a nozzle assembly 1801 includes an exterior nozzle 1803, a central nozzle 1805 and an interior nozzle 1807. The width of the layer that is extruded from the exterior and interior nozzles 1803 and 1807, respectively, may be varied by adjusting the relative separation of these nozzles, either manually or automatically under servo control. FIG. 8(a) illustrates the exterior and interior nozzles being widely separated for a wider rim layer, while FIG. 8(b) illustrates these same nozzles being compressed together for a narrower rim layer. The flow rate of the extruded material may be reduced during a wider setting to insure that a full layer is extruded. The separating distance between the two rim nozzles may be varied during the extrusion of a structure to facilitate the construction of structures such as domes with a progressively thinning wall or to make certain walls, such as interior walls, thinner than other walls, such as exterior walls. Appropriate adjustments could also be made to make one rim layer thinner than the other.

A broad variety of construction applications may advantageously utilize one or more of the nozzle assemblies that have now been described.

For example, a nozzle assembly may include a roller that follows the extrusion and creates textures on the walls of the layers that are extruded.

A nozzle assembly may also be attached to an arm of a robotic system. Under computer or other control, the nozzle assembly may extrude the walls of an entire building, including several rooms. A gantry system may be used to support and position the nozzle assembly as it traverses the need paths. A positioning system may also be used to accurately position the nozzle assembly, such as a system that includes fixed reference points and a laser-guided detector mounted on the nozzle assembly.

Instead of one large gantry system and a single nozzle assembly traversing the layers of the entire structure, a plurality of nozzle assemblies may simultaneously be employed. Each may be attached and controlled by the arm of a small mobile robot dedicated to that nozzle assembly. The position and actions of this workforce of robots may be directed wirelessly by a central command station. Each one of these small robots, in turn, may include on-board tanks to contain the necessary materials that are extruded. These small robots may also return to a central filling station to refill their tanks when needed.

Rigid horizontal members may be used to facilitate the construction of windows, door openings and ceilings by bridging openings beneath them. To create a window, for example, the controller of a nozzle assembly may turn off the flow of material to all outlets in the nozzle assembly when the nozzle assembly is traversing an area that has been designated as the window opening. After the top of the walls surrounding the window have been extruded, a rigid horizontal member may be placed across the top of these walls to create the header of the window. One or more continuous layers of material may then be extruded on top of the header and the surrounding walls. A similar bridging approach may be used to create door openings. A ceiling may similarly be created by placing a series of neighboring structural members across the top walls of a structure, over which material may be extruded to give strength to the structure.

One or more of the robotic systems described above may also be used to place these structural members where needed, i.e., across the tops of window and door openings and across the tops of wall structures to provide a roof.

A variety of techniques may also be employed in an automated fashion to reinforce the strength of walls that are extruded. These techniques may include the automated insertion or embedding of clips across or within the rims of the walls periodically along their length. These reinforcement mechanisms may also include the insertion of rigid vertical members within the interior of the wall, including, in certain embodiments, rigid horizontal links between these vertical members. Again, all of this may be accomplished under automated robotic control.

Plumbing may also be installed as part of the automated process. Segments of plumbing pipe may be secured to other segments using automated installation and welding techniques.

Electrical wiring may similarly be installed as part of the automated process. Electrical wires may be housed in modules that are connected together within the walls, again under robotic control.

Sensors may be inserted within the structure to provide feedback regarding construction performance. After the structure is completed, these sensors may continue to be used to report on information about the structure, such as heat, humidity, and deformation.

Tiling and even painting may similarly be done under robotic control.

A mixer may also be provided in association with a nozzle assembly to allow the components of a fast-curing material to be mixed near the head of the assembly.

By combining some or all of these features into a single system, the vast majority of a sound and quality structure may be built according to custom specifications very quickly, efficiently, accurately and with few personnel.

Although now having described certain embodiments of nozzle assemblies, construction methods and walls, it is to be understood that the concepts implicit in these embodiments may be used in other embodiments as well. In short, the protection of this application is limited solely to the claims that now follow.

I claim:

1. A construction method comprising:
   simultaneously extruding a first layer of two, spaced apart rims; and
   after extruding the first layer of rims, simultaneously extruding a further layer of two, spaced apart rims, each directly or indirectly on top of the first layer of one of the spaced apart rims, along with a first layer of filler between the first layer of two, spaced apart rims.

2. The construction method of claim 1 wherein the height of the first layer of rims and the first layer of filler are all substantially the same.

3. The construction method of claim 1 wherein the material used for the rims is different than the material used for the filler.

4. The construction method of claim 3 wherein the material used for the rims is plastic and the material used for the filler is concrete.

5. The construction method or claim 1 wherein the first layer of rims is permitted to cure before extruding the further layer of rims and the first layer of filler.

6. The construction method of claim 1 further including, after extruding the further layer of rims, extruding a further layer of filler on top of the last extruded layer of filler without also simultaneously extruding a further layer of rims.

7. A multi-nozzle assembly system comprising:
   a first nozzle configured to extrude a first material through a first outlet;
   a second nozzle configured to extrude the first material through a second outlet;
   a third nozzle configured to extrude a second material different from the first material through a third outlet, the third outlet being between the first and second outlets;
   a first valve configured to regulate flow of the first material to the first nozzle;
   a second valve configured to regulate flow of the first material to the second nozzle;
   a third valve configured to regulate the flow of the second material by the third nozzle; and
   a plurality of servo motors in communication with the first, second, and third valves, and operable to control the first, second, and third valves so that during a first time period, extrusion of the first material by the first and second nozzles is allowed while extrusion of the second material by the third nozzle is not allowed, then during a second time period, no extrusion by any of the first, second, and third nozzles is allowed, then during a third time period extrusion of the first material by the first and second nozzles, as well as extrusion of the second material by the third nozzle, are allowed;
   wherein the first material and the second material comprise construction material that hardens into a rigid structure after extrusion from a nozzle.

8. The multi-nozzle assembly system of claim 1 wherein each outlet has a substantially rectangular cross-section.

9. The multi-nozzle assembly system of claim 1 further including a nozzle position controller configured to controllably vary the height of at least one of the outlets with respect to the height of at least one of the other outlets.

10. The multi-nozzle assembly system of claim 1 further including a first and second trowel configured to shape material extruded from the first and second nozzles, respectively.

11. The multi-nozzle assembly system of claim 1 wherein the width of the first and the second outlet is less than the width of the third outlet.

12. The multi-nozzle assembly system of claim 1 further including an orientation-control mechanism configured to control the orientation of the multi-nozzle assembly.

13. The multi-nozzle assembly system of claim 12 wherein the orientation-control mechanism is configured to control the orientation of the multi-nozzle assembly in three dimensions.

14. The multi-nozzle assembly system of claim 1 further including a material feed system configured to feed material to each nozzle.

15. The multi-nozzle assembly system of claim 14 wherein the material feed system is configured to keep the material that is fed to the first and second nozzles separate from the material that is fed to the third nozzle.

16. The multi-nozzle assembly system of claim 14 wherein the material feed system includes a valve system configured to selectably cut off the flow of material to each of the nozzles in a controllable manner.

17. The multi-nozzle assembly system of claim 1 further including a controllable gate configured to controllably block material extruded from at least one of the nozzles from flowing in one direction.

* * * * *